United States Patent [19]
Bergmann et al.

[11] Patent Number: 6,031,946
[45] Date of Patent: Feb. 29, 2000

[54] MOVING MIRROR SWITCH

[75] Inventors: Ernest Eisenhardt Bergmann, Borough of Fountain Hill, Pa.; David John Bishop, Summit, N.J.

[73] Assignee: Lucent Technologies Inc., Murray Hill, N.J.

[21] Appl. No.: 09/061,437

[22] Filed: Apr. 16, 1998

[51] Int. Cl.[7] .................................................. G02B 6/35
[52] U.S. Cl. .................................................. 385/18
[58] Field of Search ............................... 385/18, 15, 16, 385/39, 47, 50, 19–23

[56] References Cited

U.S. PATENT DOCUMENTS

| | | | |
|---|---|---|---|
| 4,569,569 | 2/1986 | Stewart | 350/96.19 |
| 5,535,293 | 7/1996 | Buchin | 385/18 |
| 5,742,712 | 4/1998 | Pan et al. | 385/18 |
| 5,748,812 | 5/1998 | Buchin | 385/18 |
| 5,838,847 | 11/1998 | Pan et al. | 385/18 |
| 5,903,687 | 5/1999 | Young et al. | 385/17 |

FOREIGN PATENT DOCUMENTS

0 286 165  10/1998  European Pat. Off. .

*Primary Examiner*—John D. Lee
*Assistant Examiner*—Michelle R. Connelly-Cushwa

[57] ABSTRACT

A moving mirror switch includes a focusing element adapted to focus an incoming light beam transmitted from an input optical port, a movable mirror, and an actuator. The actuator moves the mirror between first and second mirror positions corresponding to reflective and pass-through states, respectively. In the reflective state, the mirror at least partially reflects the focused beam back upon the input port. In the pass-through state, the focused beam is at least partially transmitted towards an optical output port of the switch. The first and second positions may correspond to complete reflective and complete transmission states, respectively. The mirror may further be positioned in intermediate positions to achieve partial transmission states (and/or partial reflective states), such that the mirror switch operates as a variable attenuator. Embodiments are presented in which the input and output ports are disposed on the same side of the switch, or on opposite sides of switch.

23 Claims, 9 Drawing Sheets

REFLECTIVE STATE

FIG. 3C

PASS-THROUGH STATE

MOVING MIRROR SWITCH

FIELD OF INVENTION

The present invention relates generally to optoelectronics, and more particularly, to an optical switch for selectively reflecting or passing an optical signal.

BACKGROUND OF THE INVENTION

In fiber optic communications and other optical applications, optical switches are employed to selectively route optical signals. One type of prior art switch is the moving fiber switch, in which an input fiber is caused to mechanically move between two or more output fibers to allow an optical signal to be routed to a selected one of the output fibers. Another example is the electro-optic switch, which employs a material such as lithium nibate ($LiNbO_3$) having an index of refraction which is a function of an applied electric field. Depending on the amplitude of an applied electric field, an input optical signal is routed along a different surface waveguide path to a selected output port. Another type of prior art switch is the glass waveguide thermo-optic switch. This switch employs a material having a temperature-dependent index or refraction. By applying electrical current to a metallized line or the like adjacent to the material to thereby produce a local temperature rise, an optical signal is selectively routed to a desired path.

SUMMARY OF THE INVENTION

The present invention is directed towards an optical switch employing a moving mirror. In an illustrative embodiment, a mirror switch includes a focusing element adapted to focus an incoming light beam transmitted from an input optical port (e.g., fiber or waveguide), a movable mirror, and an actuator. The actuator moves the mirror between first and second mirror positions corresponding to reflective and pass-through states, respectively. In the reflective state, the mirror at least partially reflects the focused beam back upon the input port. In the pass-through state, the focused beam is at least partially transmitted towards an optical output port.

In one embodiment, a flat mirror is positioned between first and second focusing elements (e.g., lenses) to produce total reflection in the reflective state. In the pass-through state, the mirror is positioned outside the optical path between the focusing elements to obtain complete transmission. In this embodiment, the input and output ports are situated on opposite sides of the switch. The mirror may be configured with different reflectivities on opposite sides to allow, e.g., complete reflection of light originating from one side of the switch but only partial reflection from the other side during reflective state operation.

In another embodiment, the input and output ports are disposed on the same side of the focusing element. In this case, the mirror may be shaped as a corner reflector (with two faces), and the mirror is rotated between the first and second mirror positions. Complete reflective and transmission states as well as partial reflective and transmission states can be achieved via appropriate rotation of the mirror. The mirror may alternatively be flat, in which case partial and/or complete reflective states are realized by tilting the mirror. In still another embodiment, a concave mirror is employed which acts as both the focusing element and the mirror. By rotating an actuating member attached to the concave mirror, different switch states are obtained.

BRIEF DESCRIPTION OF THE DRAWINGS

For a better understanding of the present invention, reference is made to the following detailed description, taken in conjunction with the accompanying drawings in which like reference numerals indicate similar or identical elements, wherein.

DETAILED DESCRIPTION OF CERTAIN PREFERRED EMBODIMENTS

Figure 1:
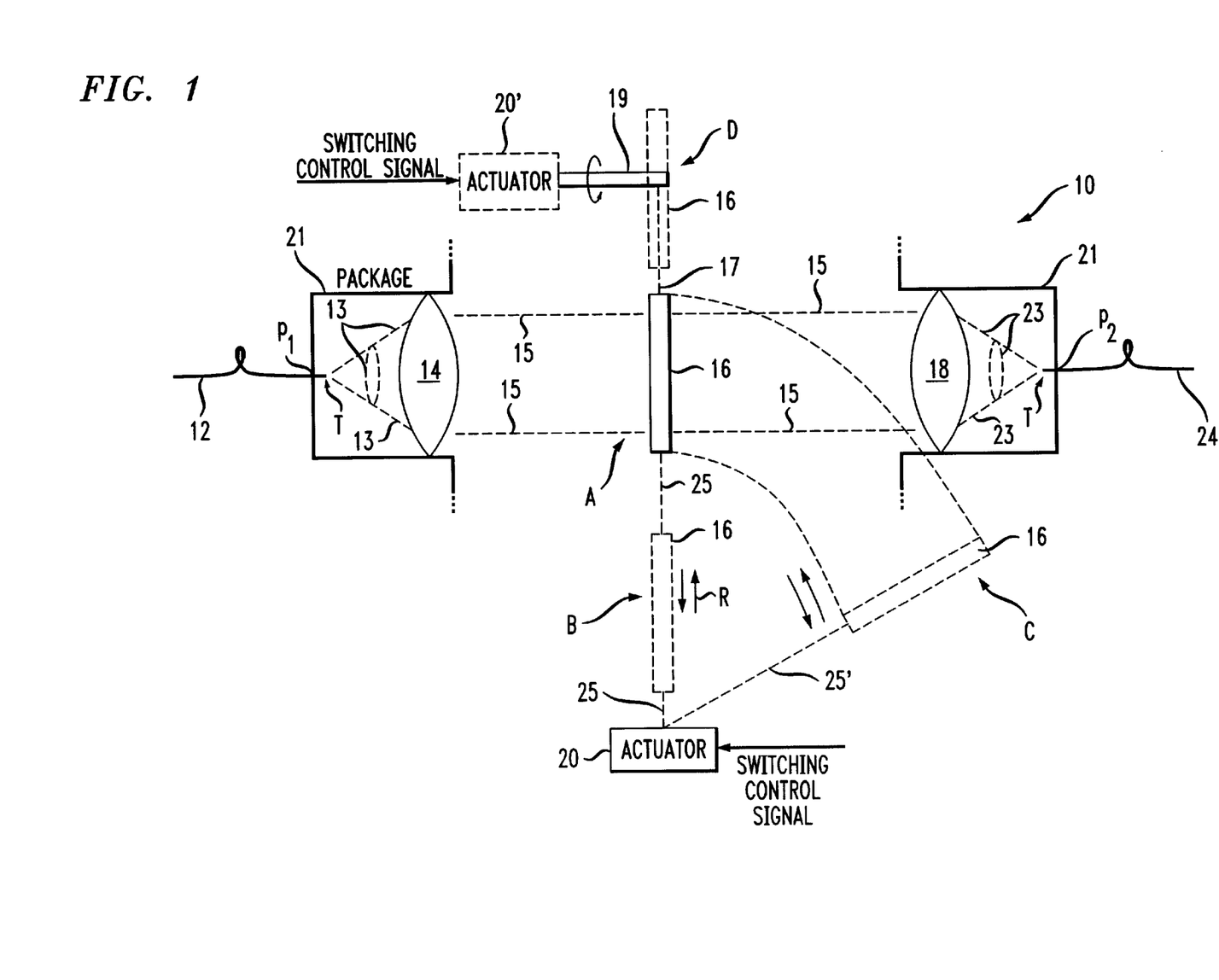
FIG. 1 illustrates an embodiment of a mirror switch in accordance with the invention.

Referring to FIG. 1, a first embodiment of the present invention, mirror switch 10, is illustrated in a cross-sectional view. Mirror switch 10 includes a pair of focusing elements 14 and 18, a movable flat mirror 16, and an actuator 20 (or alternatively, 20'). The actuator moves the mirror between a first position "A" in between focusing elements 14 and 18, and a second position, e.g., B, C or D, which is anywhere outside the optical paths of focusing elements 14, 18. The first mirror position A corresponds to a reflective switching state of mirror switch 10 whereas the second position B, C or D corresponds to a pass-through state of the switch.

In the reflective state, light originating from input optical fiber or waveguide 12, for example, is emitted from a termination T thereof to produce a diverging, solid conical beam of light 13. Light beam 13 is collimated by focusing element 14 to produce collimated beam 15, which propagates in a direction normal to mirror 16. While focusing elements 14 and 18 are shown in FIG. 1 as being double convex lenses, they may alternatively be embodied as gradient index (GRIN) lenses, plano-convex lenses, or holographic elements. (Hereafter, focusing elements 14 and 18 as well as the other focusing elements of alternative mirror switch embodiments to be discussed later, will be referred to interchangeably as lenses.) In any case, light beam 15 reflects off the flat surface of mirror 16 in the reflective switch state to produce an identical collimated beam in the opposite direction, which converges through lens 14 back into the termination T of fiber 12. Likewise, light originating from output fiber or waveguide 24 is emitted in a solid conical light beam 23, focused by lens 18 to form a collimated beam 15 (on the right side of mirror 16) which reflects off mirror 16 back into the termination T of fiber 24.

It is noted here that fibers (or waveguides) 12 and 24 are suitably retained by a package 21 at a respective input and output ports P1 and P2 of mirror switch 10. A conventional mating fiber type connector may be utilized to interface fibers 12 and 24 to the switch. (The terminations T of fibers 12, 24 may also be considered as being the mirror switch ports.)

The pass-through state is realized by appropriately transporting mirror 16 to a location outside the path of beam 15. Consequently, light originating from either fiber 12 or 24 is completely transmitted through both lenses 14, 18 and received by the opposing fiber 24 or 12, respectively. The mirror movement may be accomplished in any suitable manner, of which several examples are presented in FIG. 1. In one case, actuator 20 retracts/extracts an actuating member 25 attached to a portion of mirror 16. The mirror is thereby translated in the direction of arrows R between reflective state position A and pass-through state position B. In the alternative, actuator 20 is equipped with actuating member 25' which moves mirror 16 in an arc-like fashion as shown between reflective position A and pass-through position C. Yet another alternative configuration employs an actuator 20' (in place of actuator 20) to rotate a rod-like member 19. A member 17 extending out perpendicularly from member 19 is attached to mirror 16. Thus, as actuator 20' rotates actuating member 19, mirror 16 is translated by member 17 (in the plane perpendicular to the paper) between reflective position A and pass-through position D. In any event, the reflective and pass-through switching states are controlled in accordance with an external switching control signal applied to actuator 20 or 20'.

The design of the shapes and sizes of focusing elements 14 and 18, in conjunction with the design of the terminations T of fibers 12 and 24 to produce desired conical angles, and of the distances between each fiber tip and the closest respective focusing element 14 or 18, are such that the light incident upon the respective focusing element is collimated. The design of such parameters is well within the capability of one skilled in the art. A typical distance between fiber termination T of fiber 12 and lens 14 (or between termination T of fiber 24 and lens 18) is about 1–2 mm. The diameter of conical beam 13 or 23 when reaching lens 14 or 18 may be on the order of 0.5 mm. The distance between lenses 14 and 18 may be in the range of 1–10 mm. These dimensions are merely exemplary and may be suitably varied to achieve specific objectives. Conical beams 13 and 23 preferably have circular cross-sections, although beams with elliptical cross-sections may be generated in the alternative, particularly if asymmetric optical waveguides are employed for elements 12 and 14. All components of mirror switch 10 are preferably packaged within package 21.

In the above discussion, it was assumed that mirror 16 was completely reflective from both sides. For this case, light originating either from fiber 12 or 24 is totally reflected back upon the originating fiber during reflective state operation. In certain applications, however, it is desirable to produce only partial reflection in the reflective state, from one or both sides. For instance, in one specific optical network application, it is desirable to achieve complete reflection of light originating from the input port P1 back upon itself, but only a small percentage of reflection from the output port P2. That is, most of the light originating from output port P2 will be attenuated so that a small percentage will be reflected back upon the originating fiber 24. However, substantially all light originating from input port P1 will reflect back to port Pi. Thus, mirror 16 would act substantially as a one-sided mirror in this application. Such asymmetrical reflection can be achieved by designing mirror 16 with different materials on opposite sides. By way of example, this type of mirror switch can be employed in a "loop-back" application in which an optical signal is transmitted from a relatively distant optical source coupled via fiber 12 to port P1 (the distant transmission side). A relatively close optical source within a local communication facility or the like transmits an optical signal on fiber 24 (the local transmission side) towards the mirror switch. Thus, to sample the signals transmitted from the respective optical sources, it is desired to loop back (reflect) the transmitted signal on the distant transmission side with minimal attenuation, but with substantial attenuation on the local transmission side to prevent too strong a signal from being returned to the relatively close local communication facility. With mirror switch 10 designed to provide total reflection from the distant transmission side but only partial reflection from the local transmission side in the reflective state as just described, a prescribed amount of loop back is achievable on both sides.

Mirror switch 10 can also be configured to achieve partial transmission states such that mirror switch 10 operates as a variable attenuator. One way to achieve a partial transmission state is to position mirror 16 in between positions A and B (or between positions A and C or A and D) via appropriate control of the associated actuating member 25 or 19. Thus, a different control signal is applied to actuator 20 or 20' to achieve either a complete reflective state, a complete transmission state, or one or more partial transmission states.

It is noted that mirror switch 10 can be modified by removing focusing elements 14 and 18 and substantially shortening the length of the switch so that fibers 14 and 24 are closely spaced. This modification, however, while beneficial due to its small size, results in a switch that is more difficult to manufacture due to the very small gap between fibers (~10 μm). In contrast, the use of focusing elements 14 and 18 allows for a longer switch length, thereby facilitating the movement of mirror 16 in between the fibers as well as facilitating the manufacture of the switch.

Figure 2:
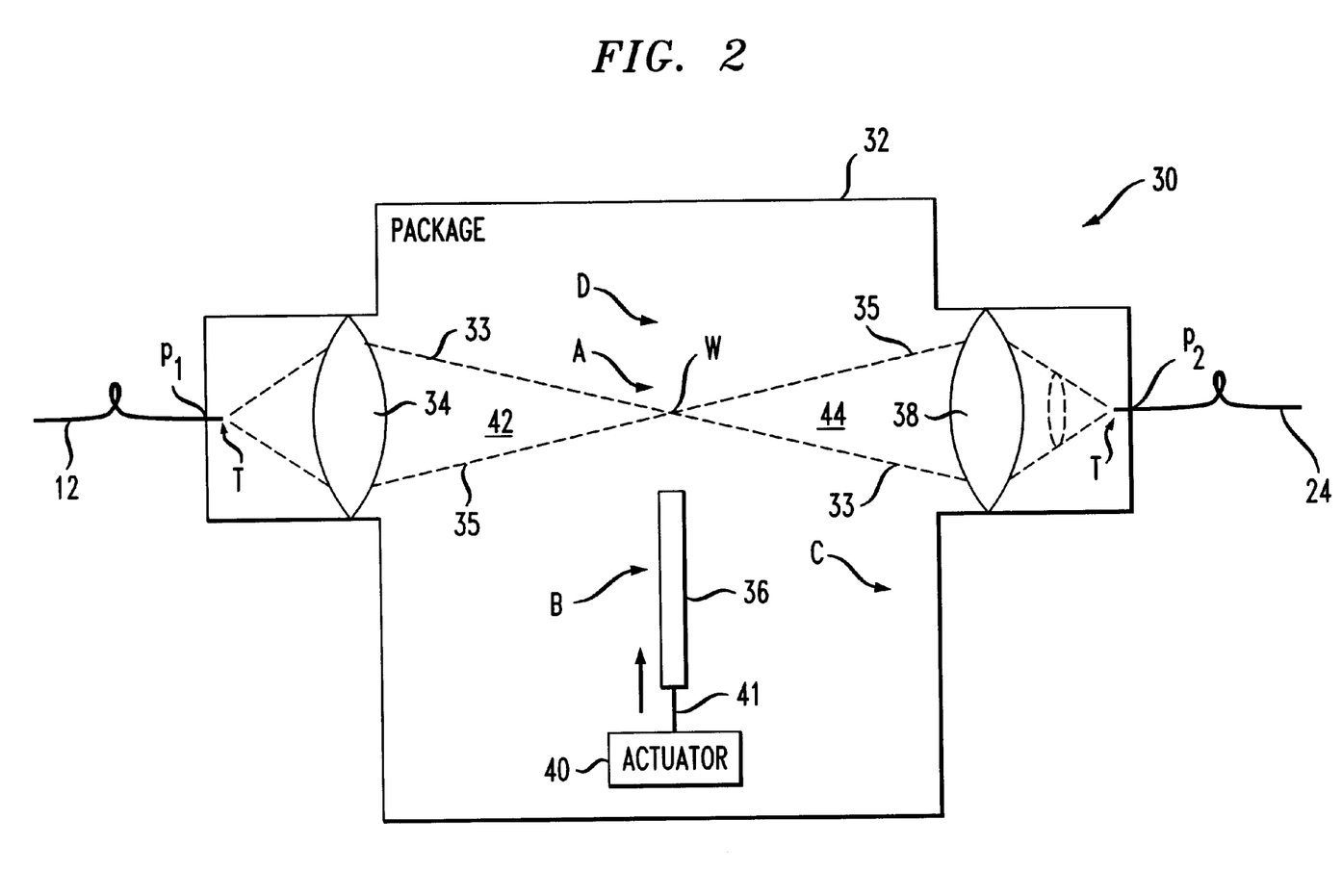
FIG. 2 illustrates another embodiment of a mirror switch.

FIG. 2 is a cross-sectional illustration of another embodiment of the present invention, designated as mirror switch 30. Switch 30 functions in a similar manner as mirror switch 10 to provide reflective and pass-through states by means of a movable mirror 36. An actuating member 41 is attached to mirror 36 to switch the mirror between two positions A and B under the control of actuator 40. Mirror 36 is shown only in position B for clarity. The mirror translation can alternatively be in the plane of the paper between positions A and D, or in an arc-like manner between positions A and C (as shown in FIG. 1). Mirror switch 30 differs from mirror switch 10 in that light originating from either fiber 12 or 24 and incident upon focusing element 34 or 38, respectively, is not collimated. Instead, light diverging from termination T of fiber 24 is converged by focusing element 34 to form a converging beam 42. Beam 42 is shown with top ray 33 and bottom ray 35 in the cross-sectional view of FIG. 2, which rays define upper and lower boundaries, respectively, of beam 42. In the pass-through state, beam 42 becomes inverted at waist W to form a beam 44 diverging towards lens 34, with ray 35 now defining the top boundary of the beam and ray 33 defining the bottom boundary. Focusing element 38 focuses beam 44 onto fiber 24, which captures substantially all of the optical energy. Operation in the pass-through state is bidirectional, such that diverging light originating from termination T of fiber 24 is converged by focusing element 38 to form beam 44, inverted at waist W to form beam 42 and then focused by focusing element 34 towards termination T of fiber 12.

In the reflective state, mirror 36 is situated at position A, with a portion of the mirror disposed near point W. Light originating from fiber 12 and producing beam 42 is reflected by mirror 36, with the light of incoming ray 33 being reflected along the path of ray 35, and vice versa, so that all reflected energy is routed back to fiber 12. Likewise, light originating from fiber 24 is reflected by mirror 36 back upon that fiber. As in the embodiment of FIG. 1, mirror 36 may be designed to produce total reflection of light originating from either end in the reflective switch state. Alternatively, mirror 36 can be designed with different reflectivities from opposite sides to allow, e.g., nearly total reflection upon the originating fiber from one side and substantial attenuation from the other side in the reflective state. In either case, since beams 42 and 44 are not collimated, the light energy to be reflected in the reflective state converges at waist W so that a smaller mirror 36 is used in this embodiment (i.e., mirror 36 can be made smaller than mirror 16). Switch package 32 may thus be smaller than package 21 of FIG. 1. Another advantage of mirror switch 30 is that the angular orientation of the mirror is less critical than for the embodiment of FIG. 1.

Figure 3A:
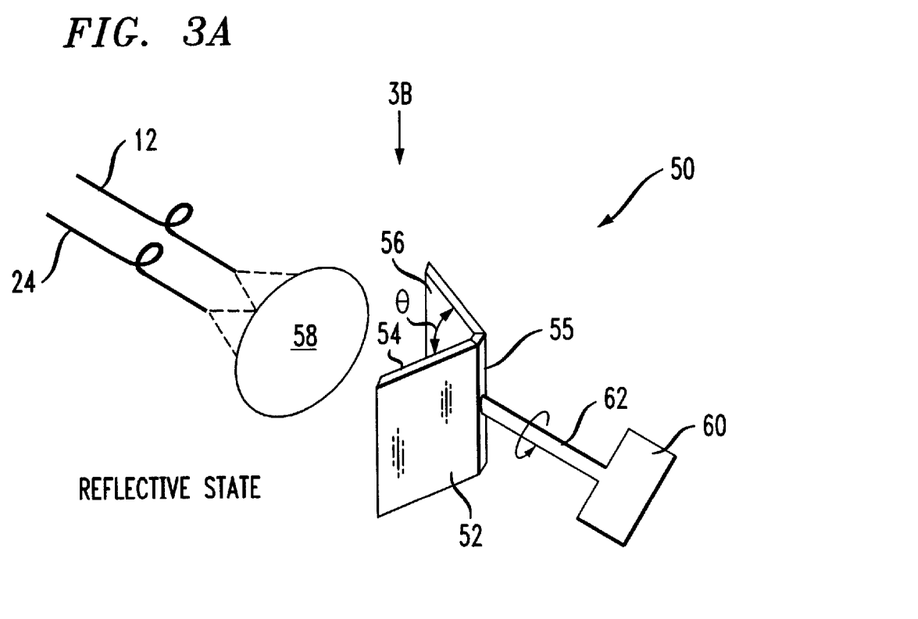
FIG. 3A is a perspective view of an alternative embodiment of a mirror switch, shown in the reflective state.
Figure 3B:
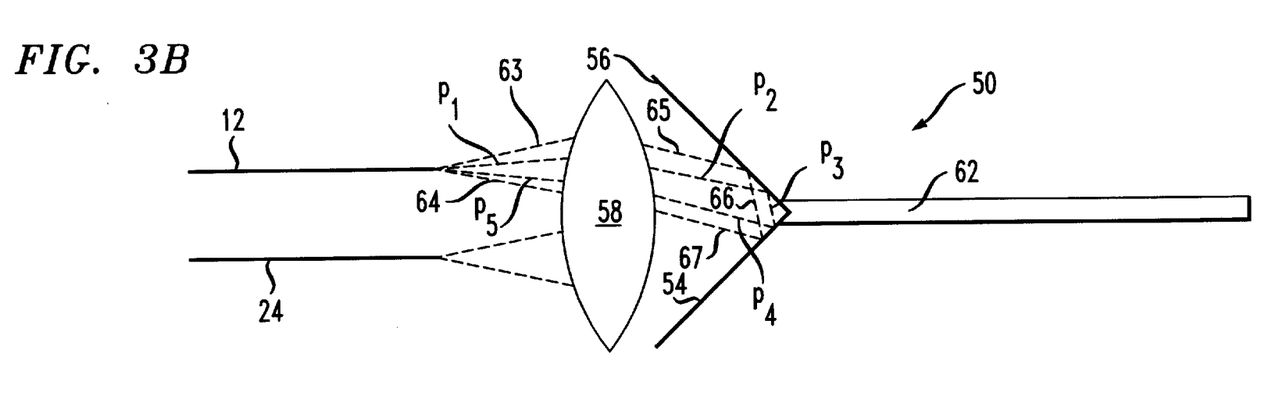
FIG. 3B is a top view of the mirror switch of FIG. 3A.

Referring now to FIG. 3A, yet another mirror switch, 50, in accordance with the invention is depicted in a perspective view. Mirror switch 50 is configured with input and output optical ports on the same side of the switch, where the tips of fibers (or optical waveguides) 12 and 24 correspond to the switch ports. Movable mirror 52 has two sides 54 and 56 oriented at right angles to one another ($\theta=90°$). Mirror 52 is configured to allow transmission of light between fibers 12 and 24 in the pass-through state, and reflection of light back upon the originating fiber 12 or 24 in the reflective state. The reflective state is illustrated in FIG. 3A, and a top view thereof is shown in FIG. 3B. Mirror 52 acts as dual-face corner reflector in the reflective state to reflect light back upon the originating fiber 12 or 24. Mirror switch 50 includes an appropriate package (not shown) to retain the switch components as well as to provide an interface connection for the fibers.

Figure 3C:
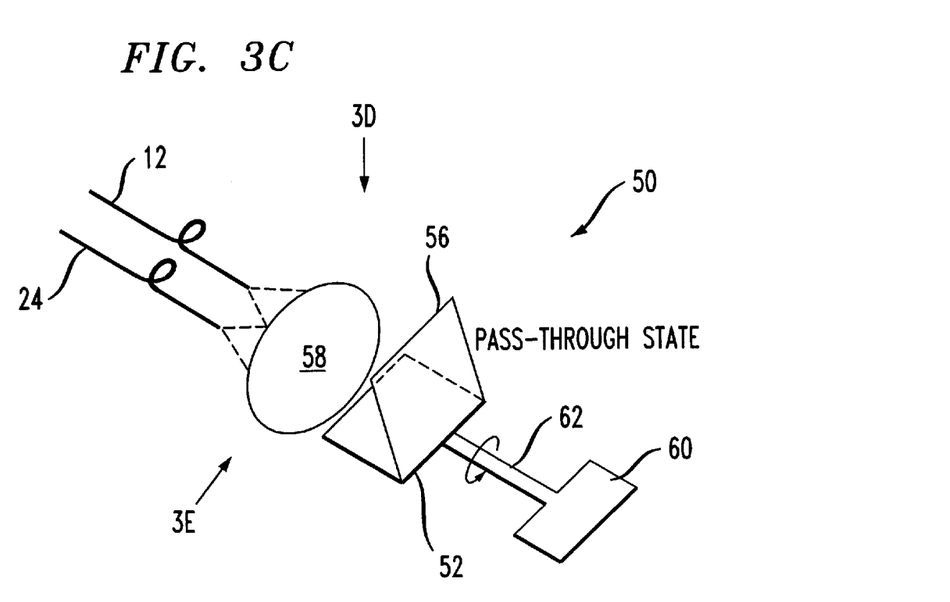
FIG. 3C is a perspective view of the mirror switch of FIG. 3A, oriented for pass-through state operation.
Figure 4:
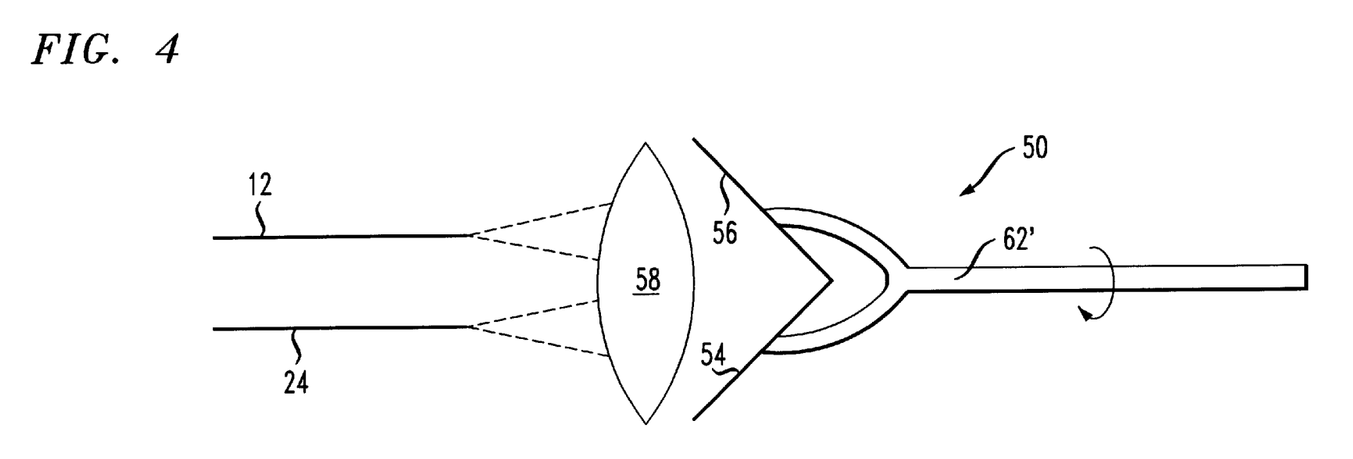
FIGS. 4 and 5 are cross-sectional views illustrating alternative mirror attachment configurations for the actuating member of FIGS. 3(A–E)
Figure 5:
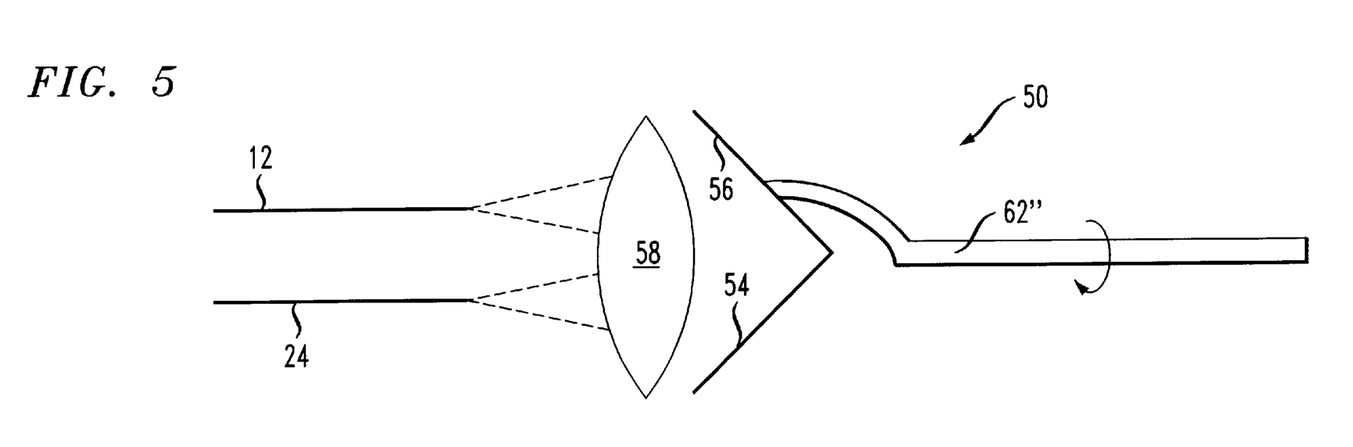

Actuating member 62 is suitably attached to the midsection of the "spine" 55 of mirror 52. Actuator 60 controls rotation of actuating member 62 in response to a switching state control signal applied to actuator 60. Switching between reflective and pass-through states is accomplished by means of actuator 60 rotating member 62 by 90° to thereby rotate mirror 52 by the same amount. A perspective view of the mirror switch in the pass-through state is shown in FIG. 3C. Alternate attachment configurations for actuating member 62 are shown in the cross-sectional views of FIGS. 4 and 5. In the embodiment of FIG. 4, actuating member 62' attaches to the rear portions of both mirror faces 54 and 56. In the embodiment of FIG. 5. actuating member 62" attaches to the rear of only one mirror face 56.

With reference now to FIG. 3B, during reflective state operation, light originating from fiber 12, for example, emerges in a solid conical beam, with light energy between edge ray 63 and edge ray 64 in the two dimensional view shown. Ray 63 emerges through collimating lens 58 as ray 65 while ray 64 emerges as ray 67. Because of collimation, rays 65 and 67 are mutually parallel. Ray 67 reflects off mirror face 54 as ray 66 which then reflects off face 56 towards focusing element or lens 58 in the opposite direction of ray 65. The reverse ray along path 65 then converges through the outer portion of lens 58, traverses the same path as ray 63 in the opposite direction and is received as reflected energy in fiber 12. Likewise, with proper design of lens 58, all the other rays comprising the conical beam are reflected off mirror 52 back into the originating fiber 12. For instance, the ray emerging along path $P_1$ is focused by lens 58 so as to propagate along path $P_2$, then along paths $p_3$ and $p_4$ after reflection by respective faces 56 and 54, and finally along path $p_5$ after being refocused by lens 58. Similarly, since fibers 12 and 24 are arranged symmetrically with respect to the "spine" of mirror 52, light originating from fiber 24 is reflected back upon itself by mirror 52 in an analogous manner. (The complete paths for light from fiber 24 are not shown for reasons of clarity.)

Turning now to FIG. 3C, mirror switch 50 is shown in the pass-through state, wherein mirror 52 is oriented at a 90° rotation with respect to its position in the reflective state. In the pass-through state, substantially all light energy transmitted by fiber 12 is reflected off mirror 52 and received by fiber 24, and vice versa for light energy transmitted from fiber 24. As shown in the top view of FIG. 3D, light originating from fiber 12 emerges in a solid conical beam with edge rays 63 and 64 in the two-dimensional view, as in the reflective state case discussed above. Ray 63 emerges through lens 58 as ray 65 whereas ray 64 emerges through the lens as ray 67. Ray 65 reflects off mirror 52 in the vicinity of spine 55. The reflected ray, 75, is converged by lens 58 to become ray 73 and received by fiber 24. Similarly, edge ray 64 bends through lens 58 as ray 67, reflects off the mirror as ray 79 and is received by fiber 24 as ray 74. Reciprocally, substantially all light energy transmitted from fiber 24 reflects off mirror 52 and is received by fiber 12.

Figure 3D:
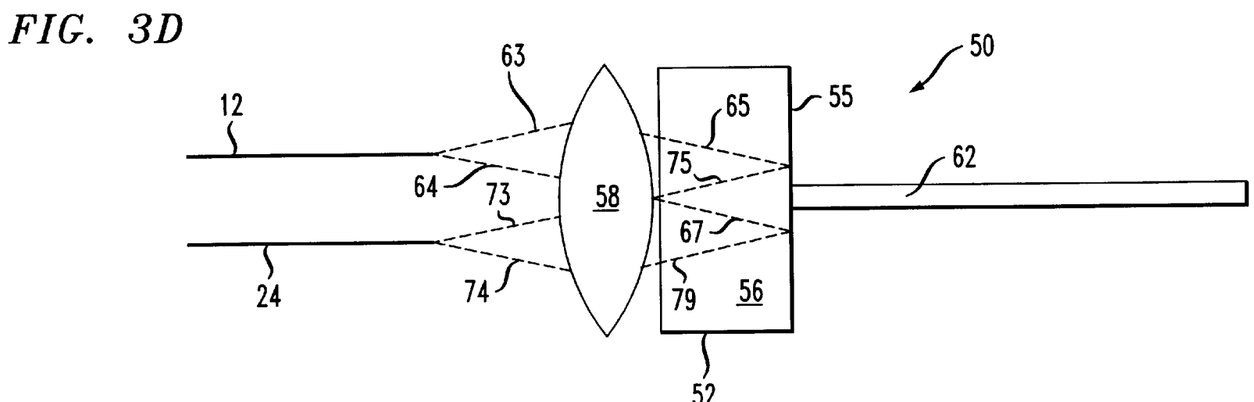
FIG. 3D is a top view of the mirror switch shown in FIG. 3C.
Figure 3E:
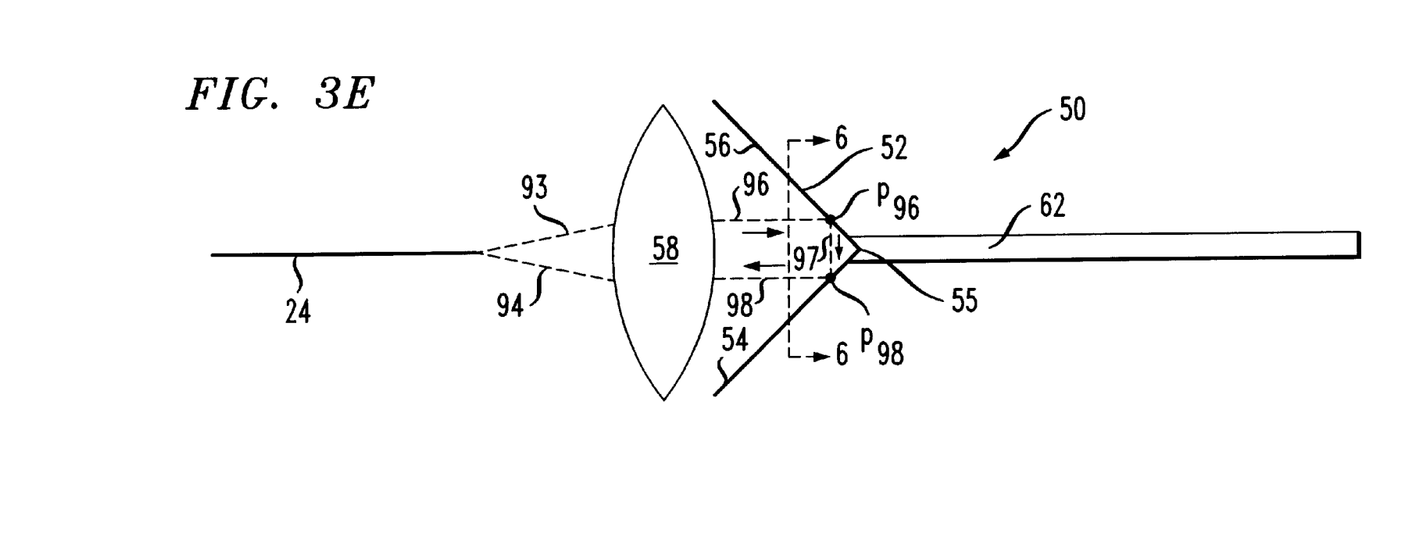
FIG. 3E is a side view of the mirror switch shown in FIG. 3C.

FIG. 3E is a side view of mirror switch 50 when oriented in the pass-through state. As shown in the figure, fibers 24 and 12 are positioned approximately at the vertical midsection of lens 58. (In this view, fiber 12 is not visible since it is directly behind fiber 24.) Light transmitted from fiber 24 emerges in the aforementioned solid conical beam. The upper edge ray, 93, transmitted by fiber 24 is received as the lower edge ray, 94, of fiber 12, and vice versa. Ray 93 from fiber 24 emerges from lens 58 as ray 96. Ray 96 reflects off face 56 at point $P_{96}$ as ray 97, which then reflects off face 54 at point $P_{98}$ as ray 98. Ray 98 is collimated by lens 58 towards fiber 12 as ray 94.

Figure 6:
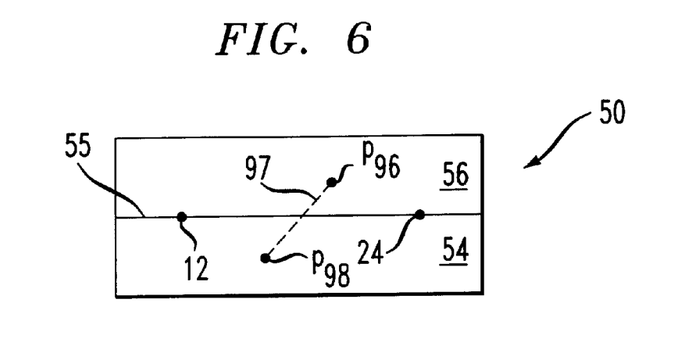
FIG. 6 is a front view of the mirror employed in the mirror switch of FIG. 3E, illustrating points of reflection for certain rays.

FIG. 6 is a front view of mirror 52 taken along lines 6—6 of FIG. 3E to illustrate the edge ray reflection points $P_{96}$ and $P_{98}$ on the respective mirror faces 56 and 54. The relative locations of fibers 12 and 24 are also shown. The reflection points $P_{96}$ and $P_{98}$ are diagonally offset such that reflected ray 97 propagates along a diagonal path with respect to the spine 55 of the mirror. Similarly, all other rays of the solid conical beam emerging from fiber 24 reflect off both sides of mirror 52 to wind up in fiber 12, and vice versa for light emitted from fiber 12.

Figure 7A:
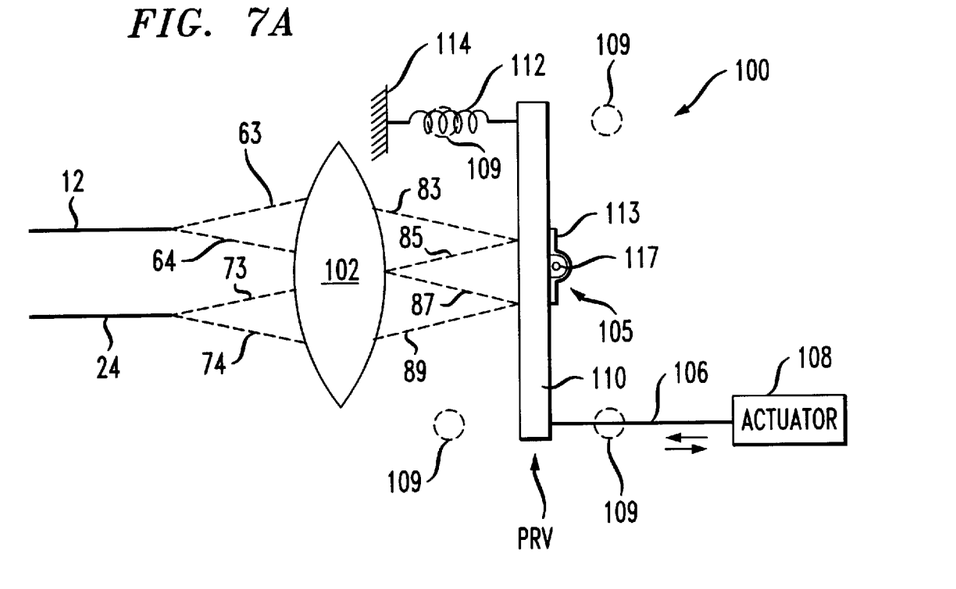
FIGS. 7A and 7B are side views of yet another mirror switch in accordance with the invention, shown in different switch states.

Turning now to FIG. 7A, still another embodiment of the invention, mirror switch 100, is illustrated in a side view. As in the embodiment just described, mirror switch 100 employs a single focusing element 102 to focus light transmitted either from fiber 12 or 24, which are disposed on the same side of the switch. Mirror switch 100 includes mirror 110 which is preferably a flat mirror, actuator 108, and actuating member 106 suitably attached to a lower portion of mirror 110. A fixed pivot 105 is attached to the center of mirror 110. Pivot 105 may include a bracket 113 retaining a pivot member 117 attached to fixed points on opposite ends. Optionally, a spring 112 may be employed (with pivot 105), with one end attached to an upper portion of mirror 110 and the other end attached to a fixed surface 114. Actuator 108 extends or retracts actuating member 106 to cause mirror 110 to pivot between several positions. Preferably, stops 109 are employed on both sides of mirror 110 to ensure proper pivot positions and to dampen oscillations.

In FIG. 7A, mirror 110 is oriented parallel to focusing element or lens 102 (defined as vertical position PRV), which corresponds to the pass-through state of the switch. The pass-through condition is achieved in an analogous manner as discussed above for the L-shaped mirror configuration (FIGS. 3A–3E). Thus, a conical beam transmitted from fiber 12 includes edge rays 63 and 64 in the shown two dimensional view, which bend through lens 102 to become rays 83 and 87, respectively. These rays reflect off mirror 110 as rays 85 and 89, respectively, and are then converged by lens 102 to provide respective rays 73 and 74, which are received by fiber 24. As such, substantial or complete transmission of light energy between transmitting and receiving fibers is achieved. In a reciprocal fashion, substantially all light energy transmitted from fiber 24 is received by fiber 12 in the pass-through state.

Figure 7B:
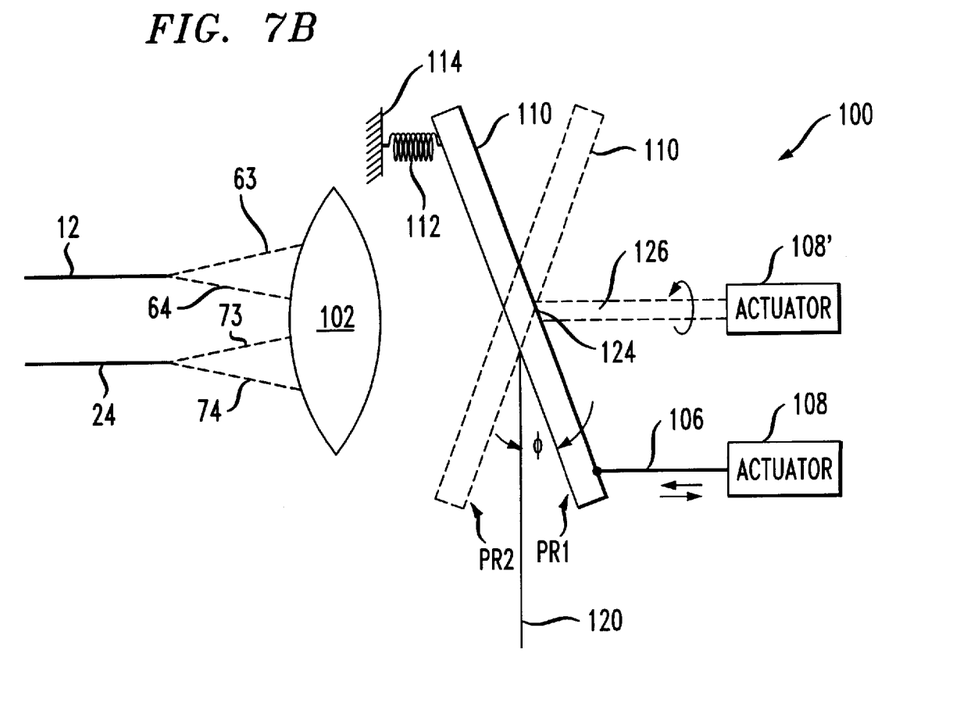

FIG. 7B illustrates mirror 110 in two different tilted positions, PR1 and PR2, corresponding to first and second partial or complete reflective states. In position PR2, light originating from fiber 12 is completely or partially reflected back upon itself, depending on the tilt angle φ from vertical reference line 120. Conversely, with mirror 110 still in position PR2, light originating from fiber 24 is reflected in a diverging direction from both fibers 12 or 24, such that none or only a small percentage of this light is reflected back upon fiber 24 or towards fiber 12. In mirror position PR1, light originating from fiber 24 is completely or partially reflected back upon fiber 24, whereas fiber 12 is uncoupled to itself or to fiber 24.

Mirror switch 100 can also be used as a variable attenuator, since the amount of transmission loss between fibers 12 and 14 is a function of tilt angle φ. In other words, various partial transmission states, as well as partial reflective states, are achievable with mirror switch 100.

Actuator 108 is responsive to an external control signal to control the tilt angle by retracting or extracting actuating member 106. Retraction/extraction of member 106 results in compression/expansion of spring 112 (if used) and pivoting about pivot 105 (not shown in FIG. 7B for clarity), thereby tilting mirror 110 to the orientation desired.

A rotary type actuator 108' can be utilized in place of actuator 108, in which case neither pivot 105 nor spring 112 are included. Actuator 108' controls rotation of a rotating member 126 in the plane perpendicular to the paper. Rotating member 126 has a slanted tip 124 which is suitably attached to the central region of mirror 110. Consequently, when actuating member 126 is rotated by 180°, mirror 110 rotates from position PR1 to position PR2.

Figure 7C:
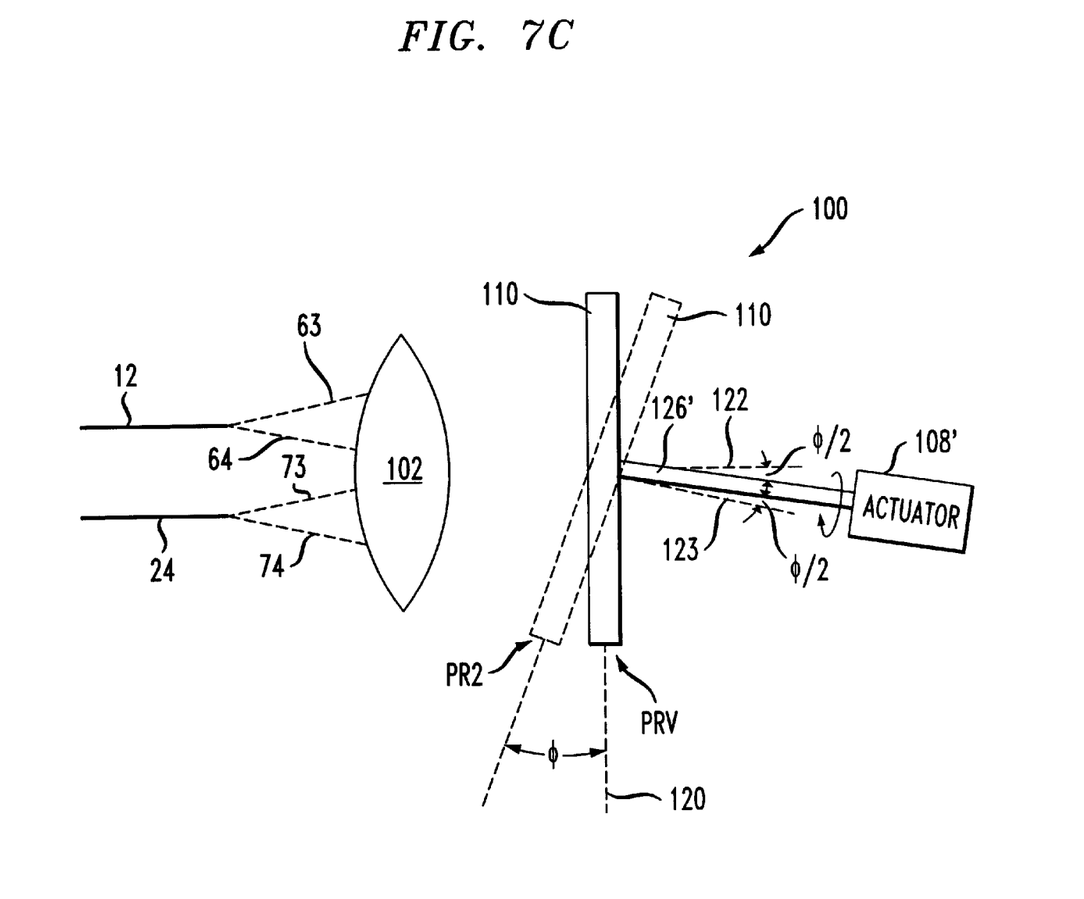
FIG. 7C is a side view of the mirror switch of FIG. 7A with an alternative actuating mechanism.

Referring to FIG. 7C, another configuration for the actuation mechanism of mirror switch 100 is shown. In this embodiment, actuator 108' rotates an actuating member 126' which is attached to the rear of mirror 110 at a skewed angle φ/2 with respect to the normal 122 to the mirror. (Normal reference line 122 is perpendicular to mirror 110 when it is oriented in vertical position PRV.) This configuration is useful to allow switching between the pass-through state (vertical position PRV) one or more asymmetrical reflective states, e.g., such as that corresponding to position PR2. (As discussed above in reference to FIG. 7B, tilt position PR2 provides an asymmetrical reflection state since light energy transmitted from fiber 12 is partially or completely reflected back to fiber 12 whereas light transmitted from fiber 24 is not reflected back upon itself.) Actuator 108' rotates member 126', causing mirror 110 to "wobble" between positions PRV and PR2, where mirror 110 is tilted in position PR2 by φ with respect to vertical reference line 120. When in position PR2, the normal reference line, 123, to mirror 110 is tilted by φ/2 below the axis of actuating member 126'.

In an alternative configuration, flat mirror 110 of FIGS. 7A–7C can be replaced by the dual-face corner reflector mirror 52 of FIGS. 3A–3E. In this case, the pass-through state would be achieved with the dual-face mirror oriented vertically, in essentially the same manner as shown in FIG. 3D. Partial reflective states and/or partial transmission states would be achieved by tilting the mirror as shown in FIG. 7B (i.e., with mirror 110 replaced by mirror 52 in the figure). For this embodiment, either the push/pull type actuator 108 or the rotary type actuator 108' or 108" can be used to switch between the partial reflective states (or between partial transmission states).

Referring again to FIGS. 3(A–C), mirror switch 50 can also be used to provide partial reflective states in addition to the pass-through and total reflective states by rotating mirror 52 to a position in between the total reflective and pass-through positions of FIGS. 3A and 3C, respectively. The partial reflective states achieved in this case would correspond to high reflective loss conditions.

Figure 8A:
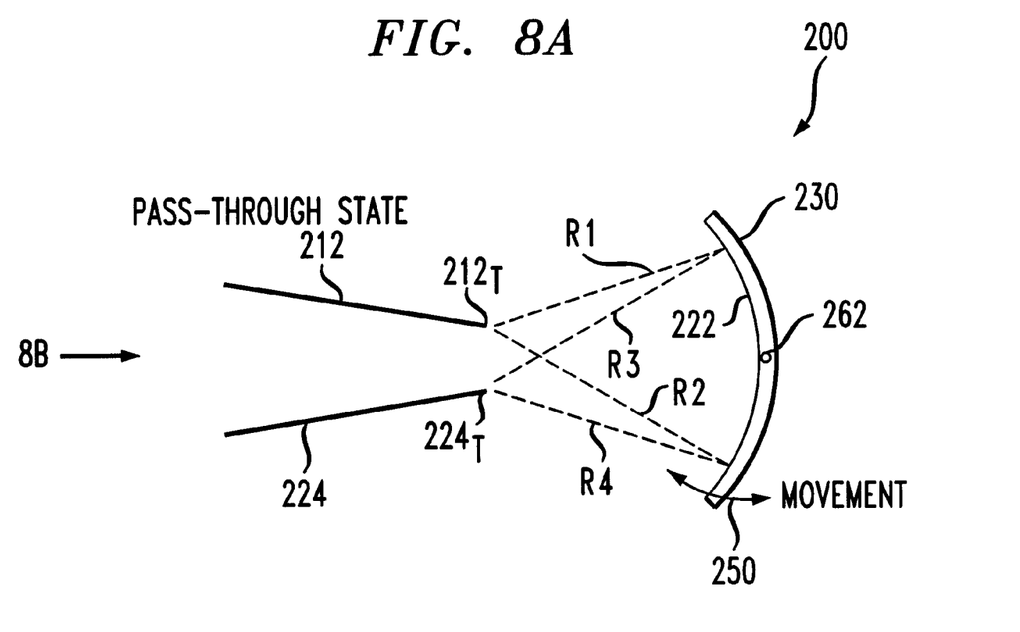
FIGS. 8A and 8B are side views illustrating an embodiment of the invention employing a concave mirror focusing element.

Referring to FIG. 8A, yet another embodiment 200 of the present invention is illustrated in a cross-sectional view. Mirror switch 200 employs a concave mirror 230 having a reflective inner surface 222. Mirror 230 operates as both a focusing element and a reflector. As shown in the front view of FIG. 8B, mirror 230 has a circular outline and is affixed to an actuating member 262 rotatably driven by actuator 260. Input optical fiber or waveguide 212 is terminated with a termination $212_T$ designed to radiate a solid conical light beam with edge rays R1 and R2 in the two dimensional view shown. Output fiber or waveguide 224 likewise emits or receives a solid conical beam with edge rays R3 and R4 from its termination $224_T$. (The fiber terminations correspond to the ports of switch 200). The conical angles are selected and the ports positioned with respect to mirror surface 222 such that ray R1 reflects along the path of ray R3 and ray R2 reflects along the path of ray R4. As a result, for the mirror orientation of FIG. 8A (pass-through state), all light emitted from fiber 212 is received by fiber 224, and vice versa. Hence, mirror 230 focuses the light beam transmitted from one port in the direction of the other port.

Figure 8B:
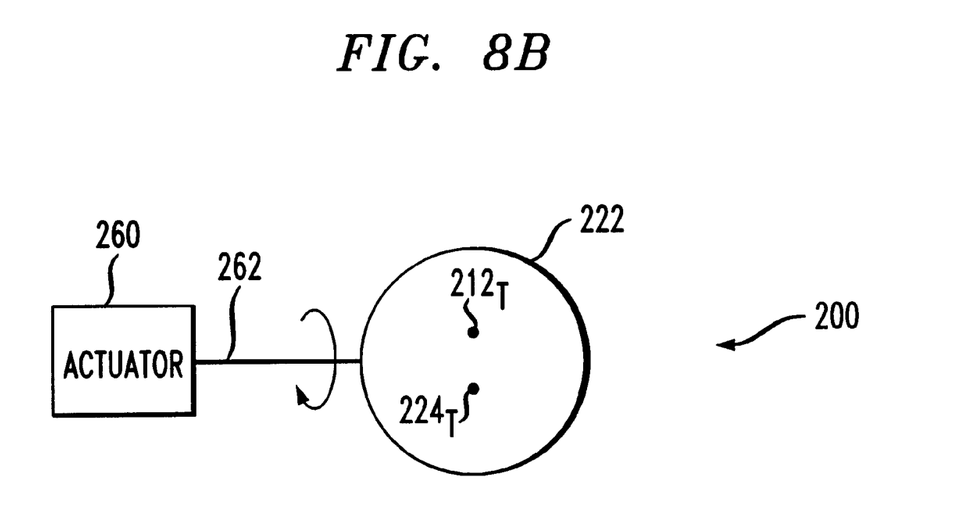

Partial reflective states and/or partial transmission states are realized by swinging mirror 230 about its axis (aligned with member 262) in the direction of arc 250 to predetermined positions. Rotation is achieved by means of actuator 260 rotating actuating member 262, the latter of which is suitably affixed to a rear or side portion of mirror 230. Accordingly, with this embodiment, pass-through and partial reflective states are provided without the need for separate focusing and reflective elements, thus simplifying the construction and packaging of the switch.

While the present invention has been described above with reference to specific embodiments thereof, it is understood that one skilled in the art may make many modifications to the disclosed embodiments without departing from the spirit and scope of the invention as defined by the appended claims.

What is claimed is:

1. A mirror switch comprising:
   at least one focusing element adapted to focus an incoming light beam transmitted from an optical input port to provide a focused beam;
   a movable mirror; and
   an actuator operative to move said mirror between a first mirror position corresponding to a reflective switching state in which said mirror at least partially reflects said focused beam, and a second mirror position corresponding to a pass-through switching state in which said focused beam is at least partially transmitted towards an optical output port, said actuator further operable to move said mirror to a third mirror position in between said first and second mirror positions, said third mirror position corresponding to a partial transmission state.

2. The mirror switch of claim 1 wherein:

said at least one focusing element comprises first and second focusing elements;

said first mirror position associated with said reflective state is in between said first and second focusing elements; and said second mirror position associated with said pass-through state is outside an optical path between said focusing elements such that said focused beam avoids said mirror and is directed by said second focusing element towards said output optical port.

3. The mirror switch of claim 2 wherein said mirror has substantially the same reflectivities on opposite sides thereof such that said switch is operative in said reflective state to reflect said incoming light beam back upon said input port and also to reflect an optical beam transmitted from said output port back upon said output port.

4. The mirror switch of claim 2 wherein reflectivity of opposite sides of said mirror are different.

5. The mirror switch of claim 4 wherein reflectivity of an input side of said mirror is substantially higher than reflectivity of an output side of said mirror such that in said reflective state, a light beam transmitted from said input port is substantially reflected back upon said input port and a light beam transmitted from said output port is substantially attenuated.

6. The mirror switch of claim 2 wherein said first focusing element is operative to collimate said incoming light beam in a direction normal to said second focusing element.

7. The mirror switch of claim 2 wherein said first focusing element is operative to focus said incoming light beam upon a point in between said first and second focusing elements such that said focused beam becomes inverted and is incident upon said second focusing element in an inverted state.

8. The mirror switch of claim 1 wherein said incoming light beam is transmitted from one of an optical fiber and an optical waveguide having a termination at said input port, and received in said pass-through state by one of an optical fiber and optical waveguide having a termination at said output port.

9. The mirror switch of claim 1 wherein said at least one focusing element is selected from the group consisting of a double convex lens, a plano-convex lens, a holographic element, a concave mirror and a gradient index lens.

10. The mirror switch of claim 1 wherein a single concave mirror comprises said at least one focusing element and said movable mirror, said concave mirror operative to provide essentially complete transmission between said input and output ports in said pass-through switch state and partial reflection of said incoming light beam back upon said input port in said reflective switch state.

11. A mirror switch comprising:

a single focusing element adapted to focus an incoming light beam transmitted from an optical input port to provide a focused beam;

a movable mirror; and an actuator operative to move said mirror between a first mirror position corresponding to a reflective switching state in which said mirror at least partially reflects said focused beam back towards said input port, and a second mirror position corresponding to a pass-through switching state in which said focused beam is reflected by said mirror in a different direction and is at least partially transmitted towards an optical output port disposed on the same side of said focusing element as said input port.

12. The mirror switch of claim 11 wherein said light beam is completely reflected back upon said input port during reflective state operation and is completely transmitted to said output port during pass-through state operation.

13. The mirror switch of claim 11 wherein said mirror comprises first and second reflective sides oriented at substantially 90° to one another.

14. The mirror switch of claim 13 wherein said actuator is operative to rotate said mirror by substantially 90° between said first and second mirror positions, said first mirror position corresponds to a complete reflective state and said second mirror position corresponds to a complete transmission state.

15. The mirror switch of claim 14 wherein said actuator is further operative to rotate said mirror to at least one partial reflective state in between said complete reflective state and said complete transmission state.

16. The mirror switch of claim 11 wherein said reflective switching state corresponds to a complete reflective state, said complete reflective state obtained by tilting said mirror by a predetermined amount.

17. The mirror switch of claim 11 wherein said actuator is operative in response to a control signal to switch said mirror between a plurality of positions, each corresponding to a different partial reflective state.

18. The mirror switch of claim 11 wherein said mirror is flat, and said first and second mirror positions are tilted with respect to one another.

19. The mirror switch of claim 11 wherein said actuator is operable to tilt said mirror to a plurality of positions each corresponding to a different partial transmission state, whereby said mirror operates as a variable attenuator.

20. The mirror switch of claim 11 wherein said mirror is flat, said actuator rotatably drives an actuating member affixed to a surface of said mirror, and said actuator is operative to rotate said mirror between said first and second positions corresponding to said reflective and pass-through states, respectively.

21. The mirror switch of claim 11 wherein a single concave mirror comprises said focusing element and said mirror, said concave mirror having a reflective side facing said input and output ports, and said actuator rotatably drives an actuating member affixed to a surface of said mirror to rotate said mirror between at least said reflective and pass-through switching states.

22. The mirror switch of claim 11 wherein said focusing element is selected from the group consisting of a double convex lens, a plane-convex lens, a holographic element, a concave mirror and a gradient index lens.

23. A mirror switch comprising:

focusing means for focusing an incoming light beam transmitted from an optical input port to provide a focused beam;

a movable mirror; and means for moving said mirror between a first mirror position corresponding to a reflective switching state in which said mirror at least partially reflects said focused beam, and a second mirror position corresponding to a pass-through switching state in which said focused beam is at least partially transmitted towards an optical output port, said means for moving further operable to move said mirror position in between said first and second mirror positions, said third mirror position corresponding to a partial transmission state.

* * * * *